(12) United States Patent
Sinclair

(10) Patent No.: US 8,370,923 B2
(45) Date of Patent: Feb. 5, 2013

(54) ACCESS TO A PROCESSING DEVICE

(75) Inventor: Colin A. Sinclair, Angus (GB)

(73) Assignee: NCR Corporation, Duluth, GA (US)

( * ) Notice: Subject to any disclaimer, the term of this patent is extended or adjusted under 35 U.S.C. 154(b) by 944 days.

(21) Appl. No.: 12/220,846

(22) Filed: Jul. 29, 2008

(65) Prior Publication Data

US 2010/0031345 A1     Feb. 4, 2010

(51) Int. Cl.
*G06F 21/00* (2006.01)
(52) U.S. Cl. ............................. 726/17; 726/28
(58) Field of Classification Search .................. None
See application file for complete search history.

(56) References Cited

U.S. PATENT DOCUMENTS 7,063,253 B1 * 6/2006 Brausch et al. ............... 235/379
7,702,943 B2 * 4/2010 Haiplik et al. ................. 713/500
2006/0064762 A1 * 3/2006 Kayashima et al. ............ 726/27

* cited by examiner

*Primary Examiner* — Gilberto Barron, Jr
*Assistant Examiner* — Izunna Okeke
(74) *Attorney, Agent, or Firm* — Joseph P. Merhle

(57) ABSTRACT

Authorizing access to one or more restricted functions provided by a processing device is described. A method for authorizing such access comprises: reading at least one time from a clock associated with the processing device; storing the read time as a reference time; after the read time is stored, reading another time (a current time) from the clock. The method also includes comparing the reference time with the current time; reading a trend status associated with the reference time; and authorizing access to the restricted functions provided by the processing device if an acceptance criterion is satisfied. The acceptance criterion may require (i) the read current time to be chronologically earlier than the reference time and the trend status to be trusted backward mode, or (ii) the read current time to be chronologically later than the reference time.

10 Claims, 9 Drawing Sheets

ALLOWING ACCESS TO RESTRICTED FUNCTIONS

FIG. 3

| TREND | TREND TYPE | START TIME | LATEST TIME | NO. of READINGS | IDENTIFIER |
|---|---|---|---|---|---|
| CURRENT | | | | | |
| PREVIOUS BACKWARD | | | | | |
| PREVIOUS FORWARD | | | | | |

98a, 98b, 98c, 98d, 98e
94a, 94b, 94c

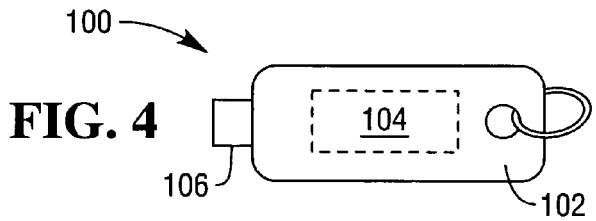

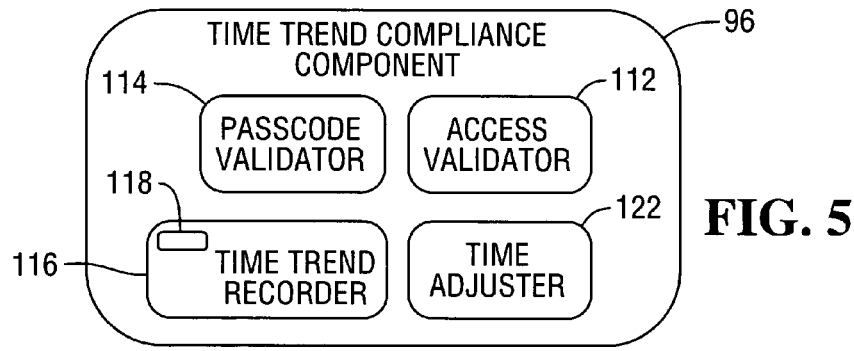

FIG. 5

TIME TREND COMPLIANCE COMPONENT — 96
114 — PASSCODE VALIDATOR
112 — ACCESS VALIDATOR
118, 116 — TIME TREND RECORDER
122 — TIME ADJUSTER

FIG. 14

| TREND | TREND TYPE | START TIME | LATEST TIME (CRT) | NO. of READINGS | IDENTIFIER |
|---|---|---|---|---|---|
| CURRENT | UNTRUSTED FORWARD | 11:54:04:11:2008 | 11:54:04:11:2008 | 1 | 012451 |
| PREVIOUS BACKWARD | UNTRUSTED BACKWARD | 08:36:23:07:2008 | 08:36:23:07:2008 | 1 | |
| PREVIOUS FORWARD | UNTRUSTED FORWARD | 11:21:02:11:2008 | 13:06:02:11:2008 | 2 | |

94a, 94b, 94c, 98a, 98b, 98c, 98d, 98e

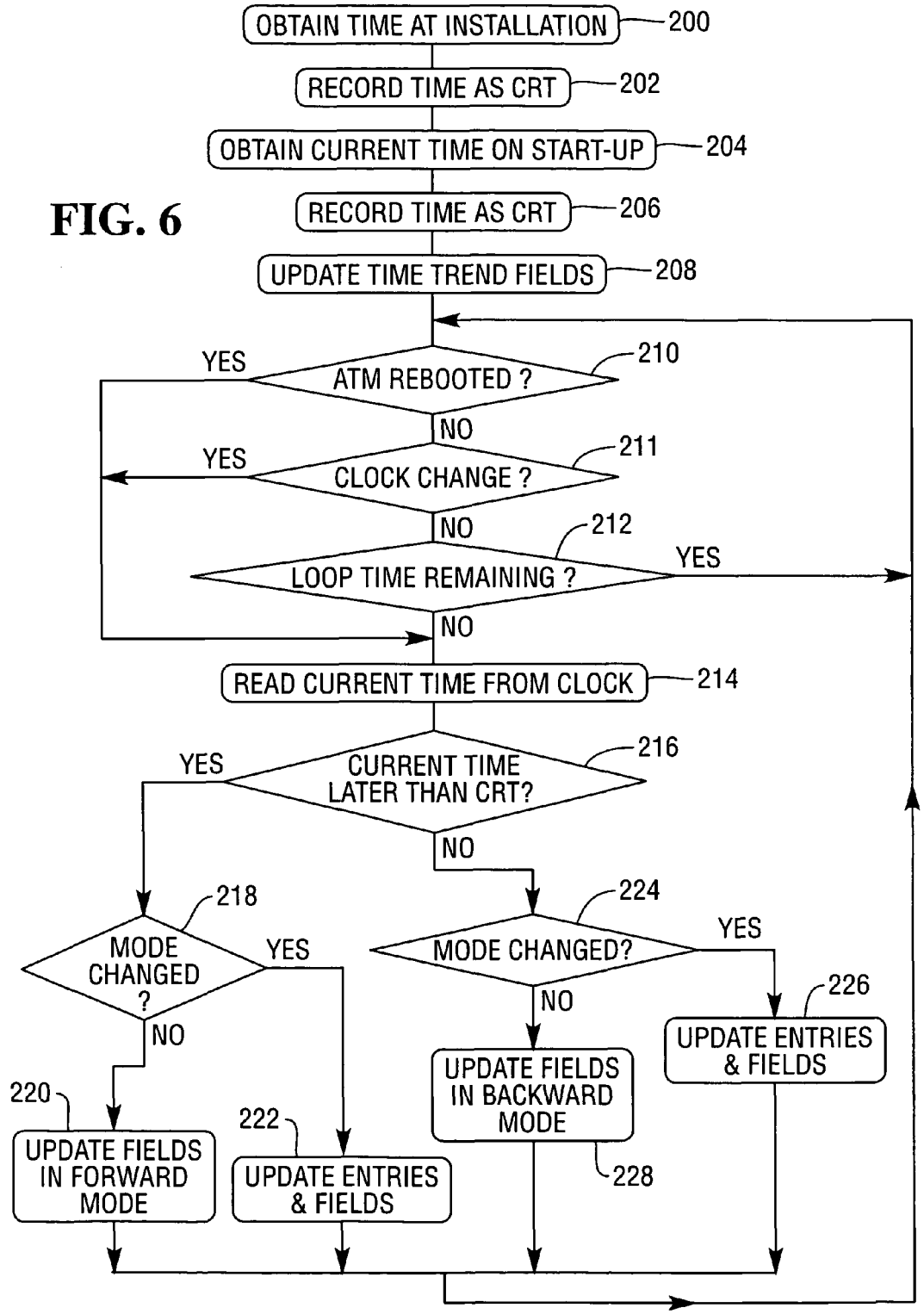

FIG. 11

| | 98a | 98b | 98c | 98d | 98e |
|---|---|---|---|---|---|
| 94a CURRENT | UNTRUSTED BACKWARD | 08:36:23:07:2008 | 08:36:24:07:2008 | 2 | |
| 94b PREVIOUS BACKWARD | | | | | |
| 94c PREVIOUS FORWARD | UNTRUSTED FORWARD | 11:21:02:11:2008 | 13:06:02:11:2008 ← CRT | 2 | |

FIG. 12

| | 98a | 98b | 98c CRT | 98d | 98e |
|---|---|---|---|---|---|
| 94a CURRENT | UNTRUSTED FORWARD | 16:18:05:11:2008 | 16:18:05:11:2008 | 1 | |
| 94b PREVIOUS BACKWARD | UNTRUSTED BACKWARD | 08:36:23:07:2008 | 08:36:24:07:2008 | 2 | |
| 94c PREVIOUS FORWARD | UNTRUSTED FORWARD | 11:21:02:11:2008 | 13:06:02:11:2008 | 2 | |

ACCESS TO A PROCESSING DEVICE

TECHNICAL FIELD

The present invention relates to a computer implemented method for restricting unauthorized access to a processing device, such as an Automated Teller Machine (ATM).

BACKGROUND

An Automated Teller Machine (ATM) is an example of a processing device to which access must be carefully controlled. Such machines are often the target of fraudsters due to the large amounts of money that they hold and also due to the confidential nature of data supplied thereto, both in the form of customer entered Personal Identification Numbers (PINs) and in the form of bank account details. However, ATMs must be accessible to authorized personnel as they require routine maintenance, replacement of parts, and updates to software. Such maintenance is carried out by field engineers, who are called out to an ATM to repair faults and to install new software and hardware.

In known systems, to access the full range of functions provided by servicing software on an ATM, a field engineer must provide a valid access token to the ATM. Without this access token, the field engineer will only be able to access a subset of the functions provided by the servicing software, namely, the non-restricted functions.

The access token is usually a machine readable device, for example a computer disk, or a USB (Universal Serial Bus) memory device, referred to herein as a USB key fob. Access tokens are granted for accessing particular ATMs for a licensed period of time. To access the full range of functions on an ATM, the access token must be valid for use on that ATM, and the current time must be between the start and end dates of the license period of the token. In addition, the field engineer is typically required to enter a valid password before access is permitted. The license period is held on the access token, and is typically in the form of a duration (in months) and an expiry date.

To reduce the possibility of a successful attack on the contents of the access token (for example, to circumvent the license dates), the access token is either encrypted (this is usual if the access token is a disk), or is implemented on a secure device, as in the case of a USB key fob. However, ensuring the security of the access token itself does not preclude fraudulent use of out-of-date access tokens. This is because an unauthorized field engineer could back-date a clock within the ATM and present an out-of-date access token. The ATM would accept the out-of-date token based on the current time shown on the ATM's clock.

It would be advantageous to reduce the possibility of this type of fraud occurring.

SUMMARY

According to a first aspect there is provided a method of authorizing access to one or more restricted functions provided by a processing device, the method comprising the steps of: reading at least one time from a clock associated with the processing device, storing the read time as a reference time; after the storing step, reading a current time from the clock; comparing the reference time with the current time; reading a trend status associated with the reference time; and authorizing access to the restricted functions provided by the processing device if (i) the read current time is chronologically later than the reference time.

The step of authorizing access to the restricted functions may also include, as an alternative to fulfilling (i), authorizing access if (ii) the read current time is chronologically earlier than the reference time and the trend status is trusted backward mode.

As used herein, a "trusted backward mode" refers to a mode in which the clock has been moved back in time by an authorized user. The authorized user may have to login and use a restricted function to move the clock backwards before trusted backward mode is entered (that is, if an authorized user changes the clock via another mechanism (such as the BIOS) then trusted backward mode may not be entered).

Authorizing access to the restricted functions under option (ii) may be limited to the same authorized user who moved the clock back in time. That same user may have to present the same access token that was used to gain access to the restricted functions if that authorized user wishes to change the clock forwards when the system is in trusted backward mode.

This is advantageous as it restricts access by a user if the time settings on the processing device have been tampered with or otherwise changed backwards or reset, so as, for example, to attempt to allow an out-of-date access token to be used to access a processing device.

As used herein, the word "time" is used in a broader sense than just to refer to the hours, minutes, and seconds within any given day; it can refer to a combination of (a) one or more of the hours, minutes, and seconds (and/or fractions thereof) within a day, and (b) the date (for example, as day, month, and year); or even just the date.

The method may allow an unauthorized field engineer to access certain unrestricted functions. These functions may include: device self-test functions, maintenance functions, preventative repair functions, and the like. This ensures that those field engineers who are not licensed can still maintain the processing device.

The restricted functions may include more detailed information, diagnostic tools, and the like.

In one embodiment, the method further comprises receiving an access token (for example, from a field engineer); recording an access time at which an attempt is made to access the processing device; reading an authorized access time period from the access token; and allowing the attempt to access the restricted functions of the processing device to continue only if the access time is within the authorized access time period. This is advantageous as it prevents access to the restricted functions provided by the processing device to any user who does not have a current, valid, access token.

The trend status may be (i) trusted backward mode, (ii) untrusted backward mode, (iii) trusted forward mode, or (iv) untrusted forward mode. Trusted backward mode may be entered when the clock is moved backwards (that is, moved to a chronologically earlier time) by an authorized user who is logged in. Untrusted backward mode may be entered when the clock is moved backwards (for example, using the BIOS or the operating system) without an authorized user being logged in. Trusted forward mode may be entered when the clock is moved forward (that is, moved to a chronologically later time) by an authorized user who is logged in. Untrusted forward mode may be entered when the clock is moved forward without an authorized user being logged in (for example, by time advancing naturally).

The trend status indicates a time-trend. A change in the trend status indicates a discontinuity in the time trend. This can be used to ascertain whether the clock has been adjusted (for example, by being back-dated).

The method may include the step of providing a privileged time adjusting mechanism to logged in authorized users, so that a trusted mode (either trusted forward or trusted backward) is only entered when the time adjusting mechanism is used to change the time on the clock. Non-privileged time adjusting mechanisms may be available to change the time on the clock, for example, via the BIOS, via another application executing on a processor controlling the clock, via an operating system, or the like.

In addition to storing the reference time, the method may include storing details about a previous forward mode (trusted or untrusted) and a previous backward mode (trusted or untrusted).

For each trend status, the method may include storing details of the earliest and/or latest time recorded for that trend status, and the number of readings taken while that mode was active (that is, until a reference time was read that was inconsistent with that trend status). The method may also include, where applicable, storing details of the identity of an authorized user who changed the trend status, for example, a serial number associated with the access token used by the authorized user.

The method may further comprise updating the reference time on one or more of the following occasions: on installation of the processing device, on start-up of the processing device, on shutdown of the processing device, at a predetermined time (for example, every Monday at noon), at predetermined regular intervals (for example, every twenty-four hours), whenever the clock is accessed (that is, when it is changed), when the processing device is changed from normal mode to supervisor mode, or at some other occasion. Any or all of these occasions can be used update a reference time.

The method may further comprise maintaining a log of historical reference times, and displaying this log visually as a graph. This will allow disruptions to the time trend (for example, discontinuities) to be easily and quickly detected.

The method may further comprise requesting a passcode, and authenticating the entered passcode, prior to allowing a user to access the processing device. This is advantageous as it further restricts access to the processing device.

The method may further comprise allowing the clock from which the reference time and the current time are read to be updated without preventing access to the processing device if the request to change the clock is made by an authorized user (that is, a user who has successfully accessed the processing device). In certain circumstances (for example to allow testing or to simulate what would happen if a fraud was perpetrated in the past), changes to the clock may be desirable.

The attempt to access the restricted functions of the processing device may be an attempt to access service software of the processing device, which may be an ATM.

According to a second aspect there is provided a processing device comprising: a clock arranged to monitor time; a memory arranged to store at least one reference time read from the clock together with a trend status associated with that time; a controller arranged to read a current time from the clock and to authorize access to restricted functions provided by the processing device only if an acceptance criterion is satisfied, where the acceptance criterion includes (i) the read current time being chronologically later than the reference time.

The acceptance criterion may be satisfied by (ii) the read current time being chronologically earlier than the reference time and the trend status being trusted backward mode.

The processing device may further comprise a port for reading an access token and deriving an authorized access time period therefrom, wherein the acceptance criterion further requires, in addition to (i) or (ii) being satisfied, that the reference time be within an authorized access time period derived from the access token.

The controller may be arranged to request a passcode, and to authenticate the entered passcode (for example if it matches the content of an encrypted access token) prior to allowing a user to access the processing device. This is advantageous as it further restricts access to the processing device. This provides a further level of security for the processing device.

The controller may be arranged to allow the clock to be changed by a user, without preventing access to the restricted functions, once that user's attempt to access the processing device has been successful. It will be appreciated that in certain circumstances changes may have to be made to the clock, for example to place the system in a test mode for the purpose of testing past events or potential future events (e.g. rollouts of new software or components). This ensures that the clock is only changed by authorized individuals and allows in certain circumstances continued access to restricted functions even though the time trend is in a backward mode, because the processing device is under the control of a trusted individual.

The clock may be provided using an oscillator on a motherboard within the controller. The memory may comprise a persistent storage medium (that is, non-volatile memory).

The processing device may be a self-service terminal, such as an information kiosk, a check-in and/or check-out terminal, an ATM, a postal services center, or the like.

The at least one reference time read from the clock and the trend status associated with that time may be stored within an operating system registry as a registry entry. The registry entry may be encrypted to ensure that it cannot easily be changed to include a different reference time. The encrypted registry entry may include an identification code associated with hardware or software within the terminal. For example, the identification code may be a serial number of a disk drive within the terminal, a MAC address of a communications facility (such as an Ethernet card) within the terminal, or the like. Including an identification code may be used to prevent encrypted data from one terminal being saved and transferred to another terminal at a subsequent time.

The controller may include an encryption/decryption facility so that a reference time can be encrypted prior to storage and decrypted when read from storage. The controller may compare the decrypted identification code stored in the registry with an identification code in hardware or software within the terminal. If the two codes do not match, the controller may deny access to the one or more restricted functions.

Any aspect described above may incorporate features of other aspects as appropriate and as will be appreciated by the person skilled in the art.

According to a third aspect there is provided a computer program comprising program instructions for executing all of the steps of the first aspect.

The computer program may be embodied on a record medium (such as a magnetic disk drive, a compact disc (CD), a digital versatile disc (DVD), a memory stick, or the like The computer program may be conveyed on an electrical carrier signal. The computer program may be stored in a computer memory.

BRIEF DESCRIPTION OF THE DRAWINGS

Embodiments of the invention will now described, by way of example only, with reference to the accompanying drawings, in which:

FIG. 3 is a block diagram illustrating the data structure of time trend information stored in the memory of FIG. 2;

FIG. 4 is a pictorial diagram of an access token (in the form of a USB key fob) for use with the processing device of FIG. 1;

FIG. 5 is a block diagram of application time trend software components executing in the ATM of FIG. 1 and for restricting access to the software illustrated in FIG. 2;

FIG. 6 is a flowchart illustrating the operation of the platform time trend software components executing on the ATM of FIG. 1;

FIG. 11 is a block diagram illustrating time trend information in the format of FIG. 3 for different time trend modes, with untrusted backward mode as the current mode;

FIG. 12 is a block diagram illustrating time trend information in the format of FIG. 3 for different time trend modes, with untrusted forward mode as the current mode;

FIG. 14 is a block diagram illustrating time trend information in the format of FIG. 3 for different time trend modes, with untrusted forward mode as the current mode.

DETAILED DESCRIPTION

Figure 1:
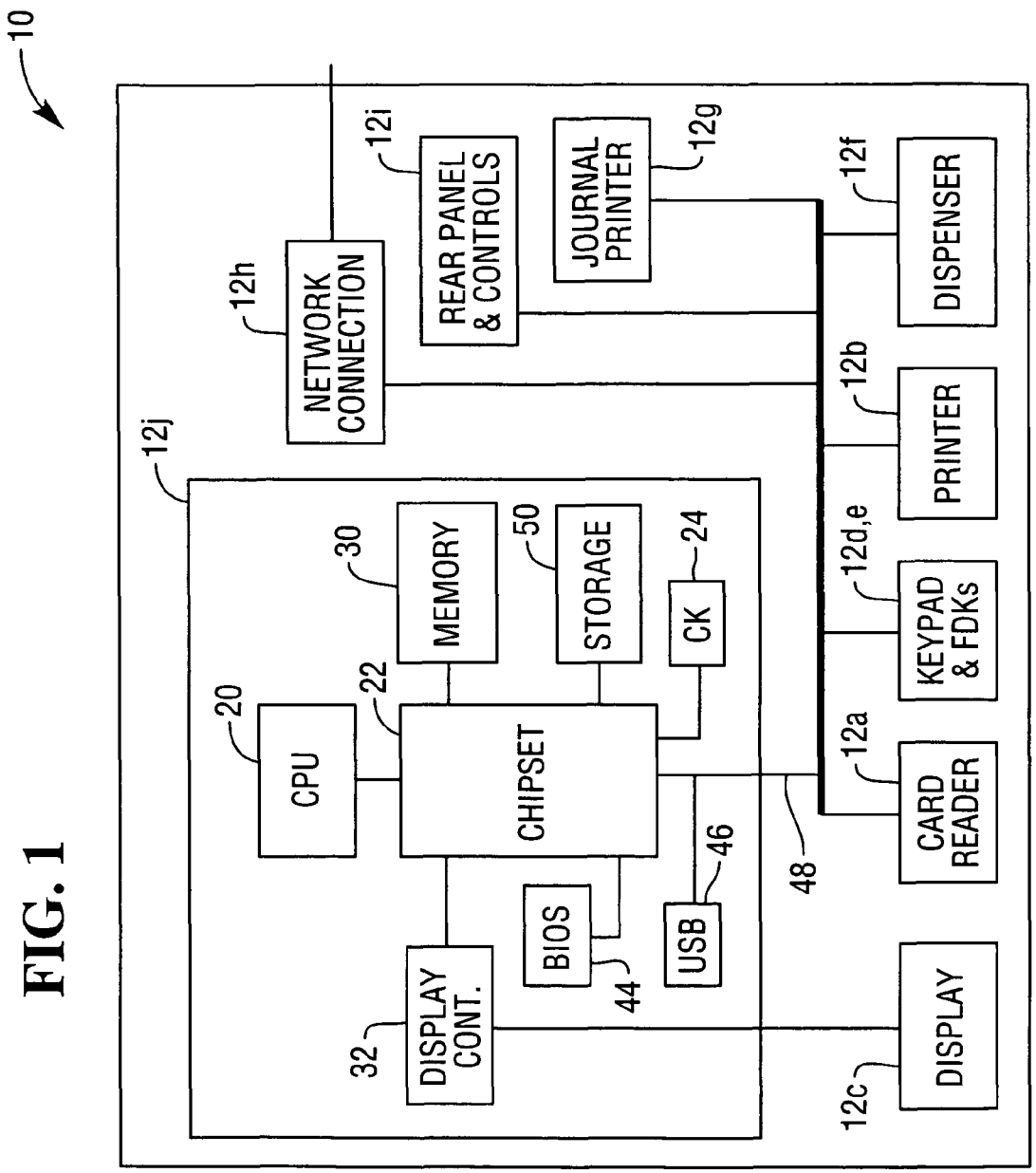
FIG. 1 is a block diagram of a processing device (an ATM) executing software to which access is restricted according to one embodiment of the present invention.

Reference is first made to FIG. 1, which is a processing device 10 in the form of a rear access ATM. The ATM 10 comprises a plurality of internal devices 12 mounted therein, including: a card reader device 12a; a receipt printer device 12b; a display 12c and associated function defined keys (FDKs) 12d disposed as two columns, each on opposing narrow sides of the display 12c; an encrypting keypad device 12e; a dispenser device 12f; a journal printer device 12g for creating a record of every transaction executed by the ATM 10, a network device 12h (in the form of an Ethernet card) for accessing a remote host (not shown); a rear operator panel (including control switches in the form of small FDKs and a mode switch) 12i, and a controller device 12j (in the form of a PC core) for controlling the operation of the ATM 10, including the operation of the other devices 12.

The rear operator panel 12i is provided to allow an authorized user (such as a field engineer) to access maintenance and diagnostic information about the devices 12, and to repair and replace devices 12 or components within the devices 12. Some of this maintenance and diagnostic information is restricted to authorized field engineers, as will be described in more detail below.

The controller 12j comprises one or more microprocessors (CPU) 20 coupled to a chipset (including memory and I/O controllers) 22. The chipset 22 is coupled to main memory 30, and to a display controller 32, in the form of a graphics card, which is coupled to the display 12c. The chipset 22 also provides ports, bridges, and interfaces for various input/output devices, including: an interface bridge to which a non-volatile memory 44 storing a BIOS is connected; USB ports 46 (connected to bus 48) to which many of the devices 12 are coupled; and an IDE (PATA) disk interface to which a disk drive 50 is coupled.

The chipset 22 includes (or is coupled to) a clock 24 that records the current time (including year, month, day, hour, minute, and second).

Figure 2:
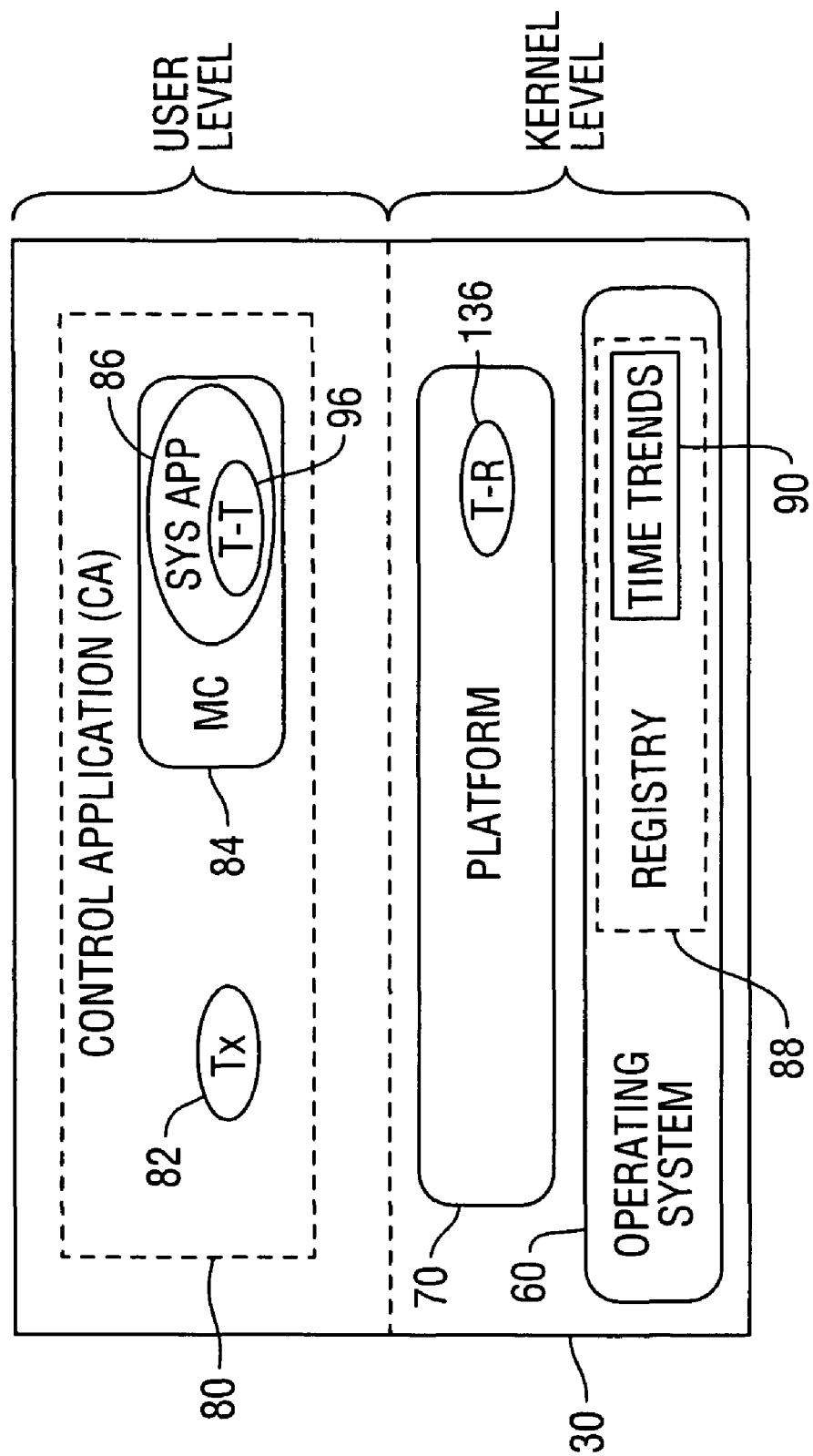
FIG. 2 is a block diagram illustrating software components (including platform and application time trend components) executing in a portion (the memory) of the ATM of FIG. 1.

When the ATM 10 is booted up, the microprocessor 20 accesses the BIOS and the disk drive 50 and loads the main memory 30 with software components, as will be described with reference to FIG. 2, which is a schematic diagram illustrating how software components interact in main memory 30.

The microprocessor 20 loads an operating system kernel 60 into the main memory 30. In this embodiment, the operating system is a Windows XP (trade mark) operating system, available from Microsoft Corporation (trade mark).

The microprocessor 20 also loads a run-time platform 70 into the main memory 30. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

The run-time platform 70 enhances the operating system 60 so that the operating system and run-time platform 70 together provide high level access to all of the devices 12, including both standard computing devices (via the operating system 60), and non-standard computing devices (via the run-time platform 70).

The microprocessor 20 also loads a control application (CA) 80 into the main memory 30. For clarity, and to aid understanding, the CA 80 is represented in FIG. 2 as comprising two logical components: a transaction processing component 82 for enabling ATM customers to conduct financial transactions at the ATM 10; and a management component 84 for enabling an authorized field engineer to access system application software that provides rich information about the status and performance of the devices 12 in the ATM 10.

The management component 84 includes a system application 86 that provides a field engineer with access to functions required to configure, diagnose, and maintain the ATM 10. The following functions (in addition to some others) are available via the system application 86: maintenance, device self-tests, event logs, service tallies, device status lists, device servicing, and device configuration.

The operating system 60 includes a registry 88 providing a time trend block 90, which is used by a component within the system application 86 to store information about: (i) a current reference time (CRT) trend and (ii) previous time trends.

The CRT is the highest value of time read from the clock 24 that the ATM 10 accepts as genuine, as will be described in more detail hereinafter. The time trend block 90 is a log of the most recent time values read by the ATM 10. In particular, the time trend block 90 stores the previous forward time trend and previous backward time trend, as will be described below in more detail.

The format used for the data stored in the time trend block 90 is illustrated in FIG. 3. There are three rows 94 of data. The first row 94a is for the current time trend, the second row 94b is for the previous backward time trend, and the third row 94c is for the previous forward time trend. These rows 94 each have five fields 98 that can be populated with data, namely: a trend type field 98a (which may be trusted forward, untrusted forward, trusted backward, or untrusted backward), a start time field 98b (which is populated with the first time reading when that trend type started), a latest time field 98c (which is populated with the most recent time reading for that type of time trend), a reading count field 98d (which stores a count of the number of readings taken during that time trend), and an identifier field 98e (which stores a unique serial number of an access token used when the clock 24 was changed to the current time trend).

The management component 84 is accessed via the mode switch on the rear operator panel 12i. In normal use, the mode switch is set to transaction mode, which allows ATM customers to conduct financial transactions via the card reader 12a, the display 12c, the encrypting keypad 12d, and FDKs 12e. When a field engineer flicks the mode switch to supervisor mode, this disables the card reader 12a, the display 12c, the encrypting keypad 12d, and FDKs 12e (if this occurs during a transaction, then the transaction is completed prior to these devices being disabled). The controller 12j then launches the system application 86, which presents a sequence of menu options to the field engineer on the rear operating panel 12i. Only some of the menu options are available to an unauthorized field engineer. Those menu options that are not available are grayed out on the rear operator panel 12i. Those grayed out menu options are restricted functions limited to authorized field engineers. The restricted functions relate primarily to servicing the ATM 10, and include diagnostics, logs, tallies, and the like.

The system application 86 includes a time trend compliance component 96 that monitors and stores time trends, and is used by the controller 12j to control access to the restricted functions.

To access these restricted functions, a field engineer can insert an access token, in the form of a secure, encrypted USB memory device (a USB key fob 100, as shown in FIG. 4), into one of the USB ports 46 in the controller 12j. The key fob 100 includes a body 102 enclosing a secure storage area 104 coupled to a USB connector 106. The secure storage area 104 stores, in encrypted form, a unique identifier (the number "012451" in this example) and a license period (in the form of a start date and a number of days). The controller 12j detects insertion of this USB key fob 100 and reads the encrypted data therefrom, including the identity, as will be described in more detail below.

Reference is now made to FIG. 5, which is a block diagram of the time trend compliance component 96. The time trend compliance component 96 comprises: an access validator 112 (which controls access to the restricted functions), a passcode validator 114 (which manages authentication of a passcode entered by a field engineer to gain access to the restricted functions), a time trend recorder 116 (which reads a current time from the clock and updates the time trend block 90), and a time adjusting mechanism 122 (which allows trusted changes to the clock to be implemented from the system application 86). The functions of these blocks of code will be described in more detail below.

The time trend recorder 116 includes an encryption/decryption facility 118 (which decrypts data read from the time trend block 90 within the registry 88, and encrypts data read thereto).

The run-time platform 70 also includes a platform time trend recorder 136 (which is identical to time trend recorder 116). The platform time trend recorder 136 executes continually; whereas, the time trend compliance component 96 (which includes the time trend recorder 116) only executes when the ATM 10 is in supervisor mode, not when the ATM 10 is in transaction mode.

Basically, when the ATM 10 is operating in transaction mode (that is, normal operation with customers executing financial transactions) then the platform time trend recorder 136 monitors and records time trends (including shutdowns and restarts of the ATM). In contrast, then the ATM 10 is switched to supervisor mode (that is, when a field engineer is operating on the ATM 10) then the time trend compliance component 96 monitors and records time trends (in addition to the platform time trend recorder 136).

Monitoring Time Trends in Transaction Mode (Normal Operation)

The way in which the platform time trend recorder 136 monitors and records time trends will now be described with reference to FIG. 6, which is a flowchart illustrating the operation of the platform time trend recorder 136. The only time trends that can be entered while in transaction mode are untrusted forward and untrusted backward. Trusted forward and trusted backward modes can only be entered while in supervisor mode. However, once in trusted forward or trusted backward mode, a reboot will return the ATM 10 to transaction mode, and the ATM 10 will remain in the trusted mode it was in immediately prior to the reboot, so the ATM 10 can be in a trusted mode during transaction mode.

On initial start-up of the ATM 10 (that is, when the platform 70 is first installed), the time trend recorder 136 polls the clock 24 to obtain an initial time (step 200), which is stored in time trend block 90 (step 202) as the CRT. All of the data written to the time trend block 90 is written in encrypted form using the encryption/decryption facility within the time trend recorder 136. In addition to time and status data, a serial number of the network connection 12h (a MAC address of an Ethernet card) is also written to ensure that the time and status data is associated with the ATM 10. All reads from the time trend block 90 are decrypted, and all temporary data (in clear text form) is deleted from memory 30 once it has been written to the time trend block 90.

Figure 7:
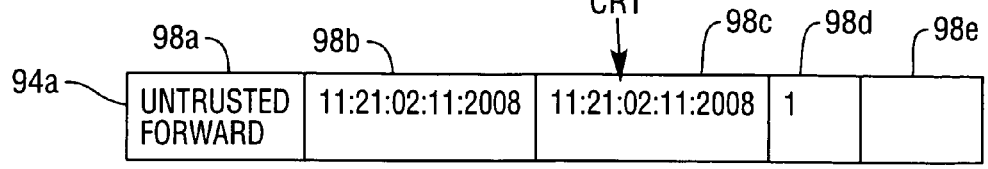
FIG. 7 is a block diagram illustrating time trend information in the format of FIG. 3, after a first reading.

As shown in FIG. 7, the time trend field 98a is updated to reflect that it is a forward time trend. In this example, the time is 11:21 on the 2 Nov. 2008, which is stored in the start time field 98b of the current time trend 94a as 11:21:02:11:2008. The latest time field 98c is also updated with the same time (since this is the first reading that has been taken from the clock 24), and the reading count field 98d is updated (incremented from "0" to "1") to reflect that one reading has been taken. The identifier field 98e is left blank because the clock 24 has not been changed by an authorized user. In untrusted forward mode, the CRT is always shown in the latest time field 98c.

Steps 200 and 202 are only implemented when the platform 70 is first installed. The remaining steps are implemented throughout the operating life of the ATM 10.

Figure 8:
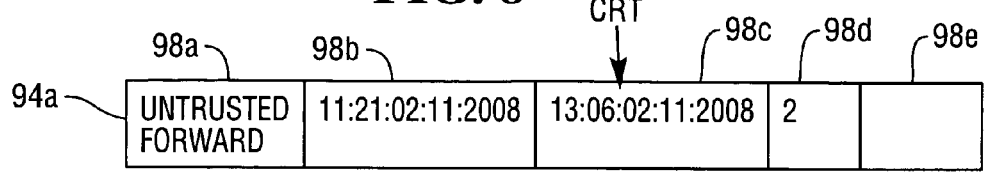
FIG. 8 is a block diagram illustrating time trend information in the format of FIG. 3, after a second reading.

Once the start-up is completed, the ATM 10 is rebooted and the time trend recorder 136 polls the clock 24 to obtain a new current time (step 204), which is then stored in the latest time field 98c of the current entry 94a of the time trend block 90 (step 206) as the CRT, as shown in FIG. 8. In this example, the new CRT reading is 13:06 (that is, 1:06 pm) on the same day (2 Nov. 2008). The other fields 98 are updated accordingly (step 208), as shown in FIG. 8. Again, the CRT is shown in the latest time field 98c.

If the ATM 10 is rebooted (step 210) then the time trend recorder 136 advances beyond a time delay step (step 212). It should be appreciated that a reboot can occur at any point in the flow shown in FIG. 6. Whenever a reboot occurs, the time trend recorder 136 starts automatically at step 214.

If the clock 24 is changed (step 211) via the operating system 60 (either directly or via an application executing in the context of the operating system 60), then the time trend recorder 136 detects this change (via a message from the operating system 60) and advances beyond the time delay step (step 212).

The time delay step (step 212) is a predetermined time period (in this example, twenty-four hours) during which the time trend recorder 136 stays in a wait loop. If the ATM 10 is not rebooted during this wait loop then the time trend recorder 136 proceeds to the next step and resets the wait loop period (to twenty-four hours in this example).

After the predetermined time period (twenty-four hours) has elapsed, or the ATM 10 is rebooted, or the clock 24 is changed via the operating system 60, the time trend recorder 136 reads the current time from the clock 24 (step 214) and compares the current time with the CRT (step 216), which is read from the latest time field 98c in the current time trend entry 94a (when in forward untrusted mode).

Figure 9:
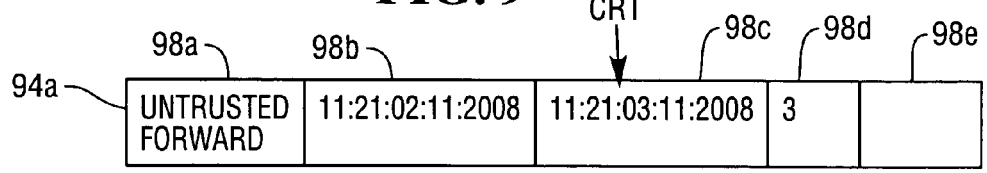
FIG. 9 is a block diagram illustrating time trend information in the format of FIG. 3, after a third reading.
Figure 10:
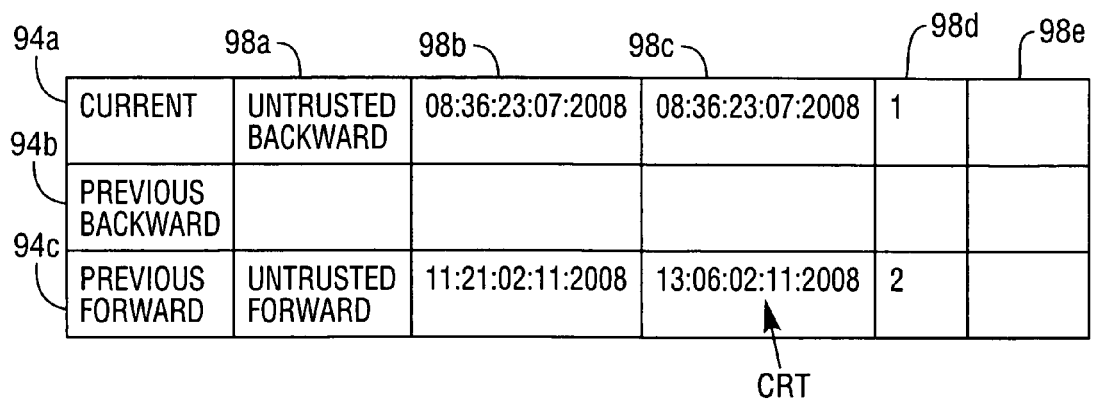
FIG. 10 is a block diagram illustrating time trend information in the format of FIG. 3 for different time trend modes, with untrusted backward mode as the current mode.

If the current time read from the clock 24 is chronologically later than the CRT, for example, 11:21 am on 3 Nov. 2008, and the mode has not changed (this will be described later) (step 218) then the time trend remains unchanged as forward mode (trusted or untrusted) and the fields 98 are updated (step 220). This includes updating the latest time field 98c with the current read time as the latest time, and incrementing the reading count field 98d, as shown in FIG. 9. The latest time field 98c now stores the new CRT.

The platform time trend recorder 136 then returns to step 210.

Returning to step 218, if the current time read from the clock 24 is chronologically later than the CRT and the mode has changed then the time trend is changed to untrusted forward and the entries 94 and fields 98 are both updated (step 222). This involves copying the previous time trend from the current entry 94a to the appropriate previous time trend (either previous forward or previous backward) and creating a new untrusted forward entry as the current entry 94a. The latest time field 98c of the current entry 94a now stores the new CRT.

The platform time trend recorder 136 then returns to step 210.

Returning to step 216, if the current time read from the clock 24 is chronologically earlier than the CRT, for example, 8:56 am on 23 Jul. 2008, and the mode has changed (step 224), then the time trend recorder 136 updates the time trend block 90 to reflect that the mode is now untrusted backward (step 226).

The time trend mode is changed to untrusted backward in the following way. The time trend recorder 136 copies the contents of the current time trend entry 94a (all of fields 98) into the entry for the previous forward time trend (entry 94c). The time trend recorder 136 also creates a new current time trend 94a and adds the new time into the start time field 98b and the latest time field 98c. The new current time trend 94a is untrusted backward. The CRT is no longer in the latest time field 98c of the current time trend 94a, it is in the latest time field 98c of the previous forward time trend 94c.

The platform time trend recorder 136 then returns to step 210 and the process continues.

The next time a current time is read from the clock at step 214 (for example, 24 hours later, or after a reboot if the reboot occurs sooner), if the current time is still earlier than the CRT (which is from field 98c on entry 94c, not entry 94a), and the mode has not changed (step 224), then the time trend recorder 136 updates the latest time field 98c in the current time trend entry 94a (step 228), as shown in FIG. 11.

The platform time trend recorder 136 then returns to step 210.

At some point, the current time read from the clock at step 214 will be later than the CRT (which may arise naturally from passage of time, or the clock 24 may be advanced). In this example, the clock 24 is manually advanced to 4:18 pm on 5 Nov. 2008 ("16:18:05:11:2008").

When this occurs, the time trend recorder 136 will detect a mode change at step 218, from backward to untrusted forward, and will change the time trend back to untrusted forward (step 222) accordingly.

The time trend mode is changed to untrusted forward in the following way. The time trend recorder 136 copies the contents of the current time trend entry 94a (all of fields 98) into the entry for the previous backward time trend (entry 94b). The time trend recorder 136 also creates a new current time trend 94a and adds the new time into the start time field 98b and the latest time field 98c. The new current time trend 94a is untrusted forward. The CRT is now in the latest time field 98c of the current time trend 94a because the current time trend is untrusted forward. The time trend block 90 appears as shown in FIG. 12.

Access to Restricted Functions in Supervisor Mode (Field Engineer Operation)

Figure 13:
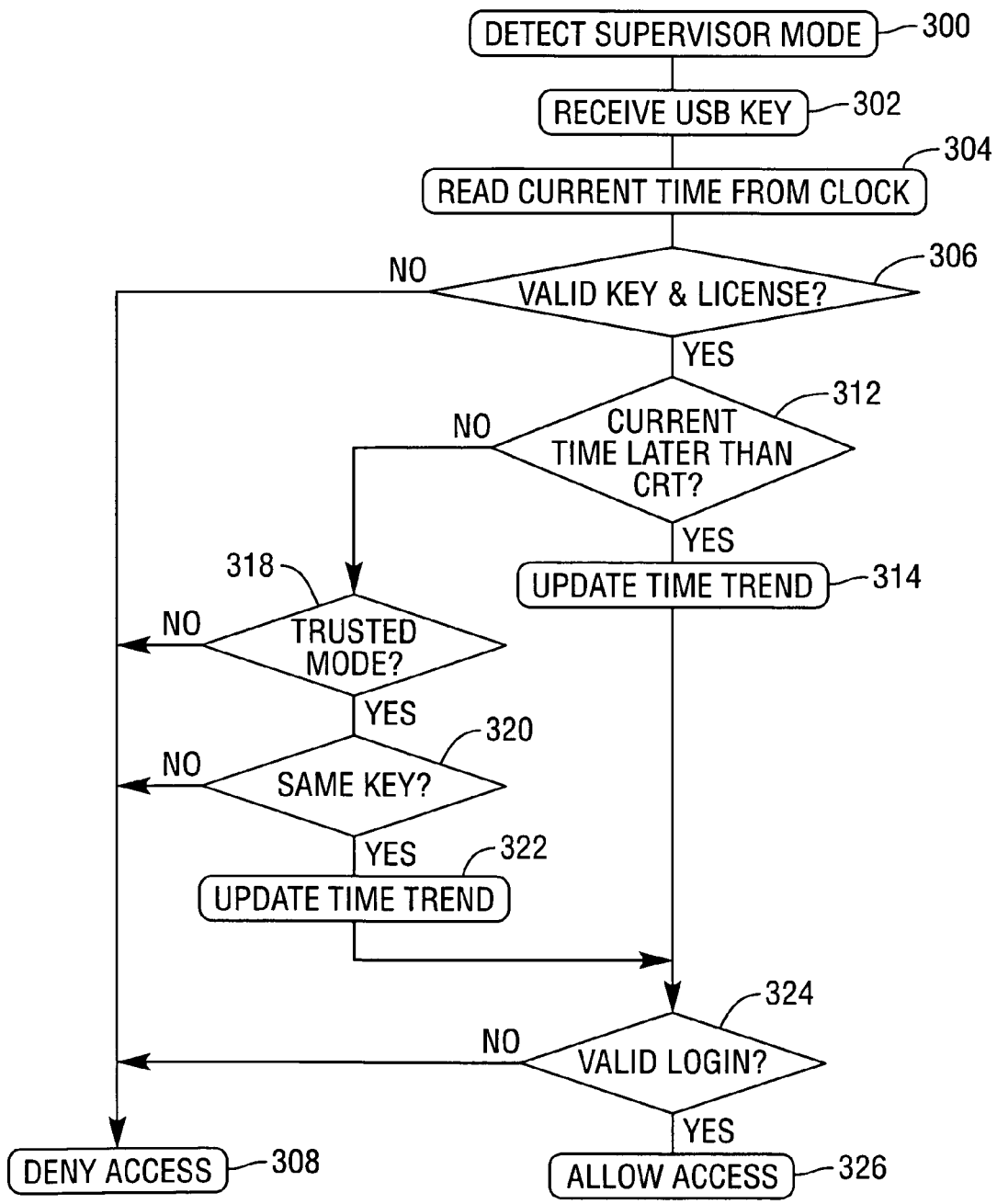
FIG. 13 is a flowchart illustrating steps involved in securing access to restricted functions of the software executing on the ATM of FIG. 1.

Access to restricted functions in supervisor mode will now be described with reference to FIG. 13, which is a flowchart illustrating steps involved in granting/denying access to the restricted functions.

When a field engineer having a USB key fob 100 wants to perform maintenance functions on the ATM 10 and to have access to the restricted functions, then the field engineer flips the mode switch on the rear operator panel 12i to supervisor mode. This is detected by the management component 84 (step 300), which ascertains if the transaction processing component 82 is currently implementing a customer transaction. If no transaction is being implemented, then the transaction processing component 82 blanks the customer display 12c (or presents text indicating that the ATM is temporarily out of service) and presents vendor mode options to the field engineer on the rear operator panel 12i. One of these options is for the field engineer to launch the system application 86.

The field engineer then inserts the key fob 100 into one of the USB ports 46 in the controller 12j. This is detected by the management component 84 (step 302), in particular, the time trend compliance component 96 within the system application 86.

The access validator 112 reads the contents of the USB key fob secure storage area 104, which includes details of the systems that the USB key fob 100 is validated to access, and a license period.

The time trend recorder 116 then reads the current time from the clock 24 (step 304). The access validator 112 then compares the read details with the details of the system to ensure that the USB key fob 100 is entitled to access the ATM 10, and also ascertains if the read license period covers the current time read from the clock in step 304 (step 306).

If either (or both) of these criteria is (are) not fulfilled, then the system application 86 denies access to the restricted functions to the field engineer (step 308). The field engineer is provided with some basic functions to ensure that the ATM 10 can be serviced, but the restricted functions (providing access to full diagnostic information) are grayed out on the rear operator panel 12i.

If the field engineer successfully completes the license key phase (that is, the USB key fob 100 is correct and the license is current) then the time trend compliance component 96 compares the read current time (from step 304) with the CRT from the time trend block 90 (step 312).

If the read current time is chronologically later than the CRT, then the time trend reporter 116 updates the time trend block 90 (step 314). In particular, the time trend reporter 116 updates the latest time field 98*c* with the read current time, increments the reading count field 98*d*, and writes the unique identifier read form the USB key fob 100 ("012451" in this example) to the identifier field 98*e*. For this example, the current time trend stored in the time trend block 90 is "untrusted forward", and the CRD is 11:54 am on 4 Nov. 2008. The updated information in the time trend block 90 is shown in FIG. 14.

The time trend compliance component 96 then allows the field engineer to proceed to the login phase.

If the read current time is chronologically earlier than the CRT, then the time trend compliance component 96 ascertains if the current time trend is trusted backward mode (step 318). If not, then the time trend compliance component 96 denies access to the field engineer (step 308).

If the current time trend is trusted backward mode (step 318), then the time trend compliance component 96 ascertains if the same USB key fob 100 is being used as was used to enter trusted backward mode (step 320). If not, then the time trend compliance component 96 denies access to the field engineer (step 308). If the same USB key fob 100 is presented as was used to enter trusted backward mode, then the time trend compliance component 96 updates the time trend (which remains trusted backwards) (step 322) and allows the field engineer to proceed to the login phase.

If the time trend phase is completed successfully, then the login phase is entered. This involves using the passcode validator 114 to compare a passcode entered by the field engineer with a saved passcode (step 324).

If the field engineer fails the login phase then the passcode validator 114 denies the field engineer access to the restricted functions (step 308). The field engineer is provided with some basic functions, but the restricted functions are grayed out on the rear operator panel 12*i*.

If the field engineer passes the login phase then the passcode validator 114 allows the field engineer (now an authorized user) to access the unrestricted functions (step 326), including the time adjusting mechanism 122, to the extent permitted by the USB key fob 100.

The time adjusting mechanism is also available to non-authorized users, but such users will not be in privileged mode, which is restricted to authorized users.

Implementing a Trusted Time Change

When in supervisor mode, once a field engineer reaches step 326, he/she is an authorized user with access to the time adjusting mechanism 122. This is referred to as being in privileged mode within supervisor mode. If the field engineer is denied access to the restricted functions, then this is referred to as being in reduced mode (or non-privileged mode) within supervisor mode.

Within privileged mode, the time adjusting mechanism 122 can be used to move the time on the clock 24 forward or backward in a trusted manner without losing access to the restricted functions. This may be useful, for example, to test compliance of the ATM software at a future time (so advancing time on the clock 24 would be useful), to reproduce an attempted fraud that occurred in the past (so moving time on the clock 24 backwards would be useful), or simply to change the clock 24 to the correct time.

Figure 15A:
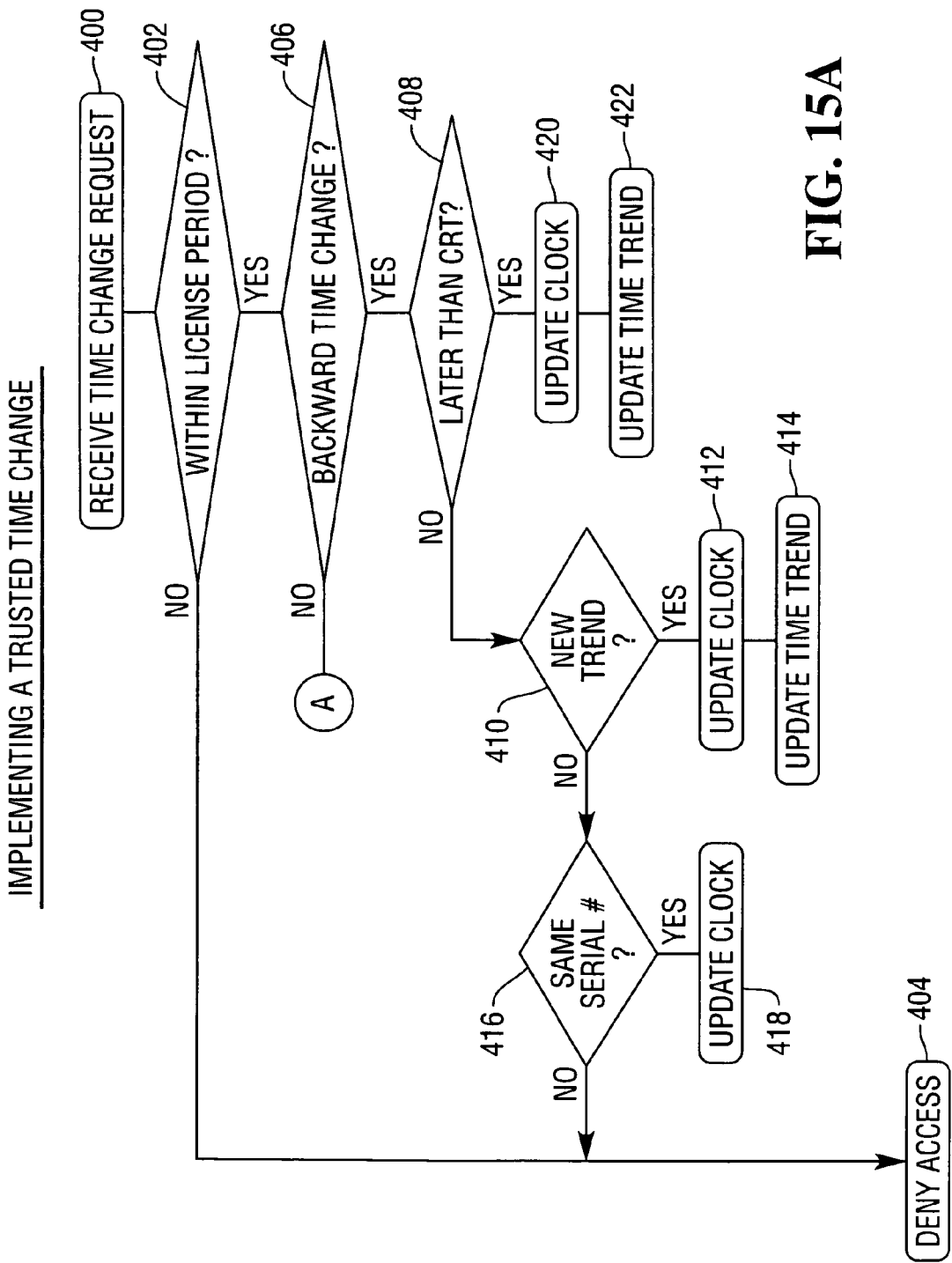
FIG. 15 is a flowchart (shown in two parts as FIG. 15A and FIG. 15B) illustrating steps involved in adjusting time on a clock of the ATM of FIG. 1 using the application time trend software components.
Figure 15B:
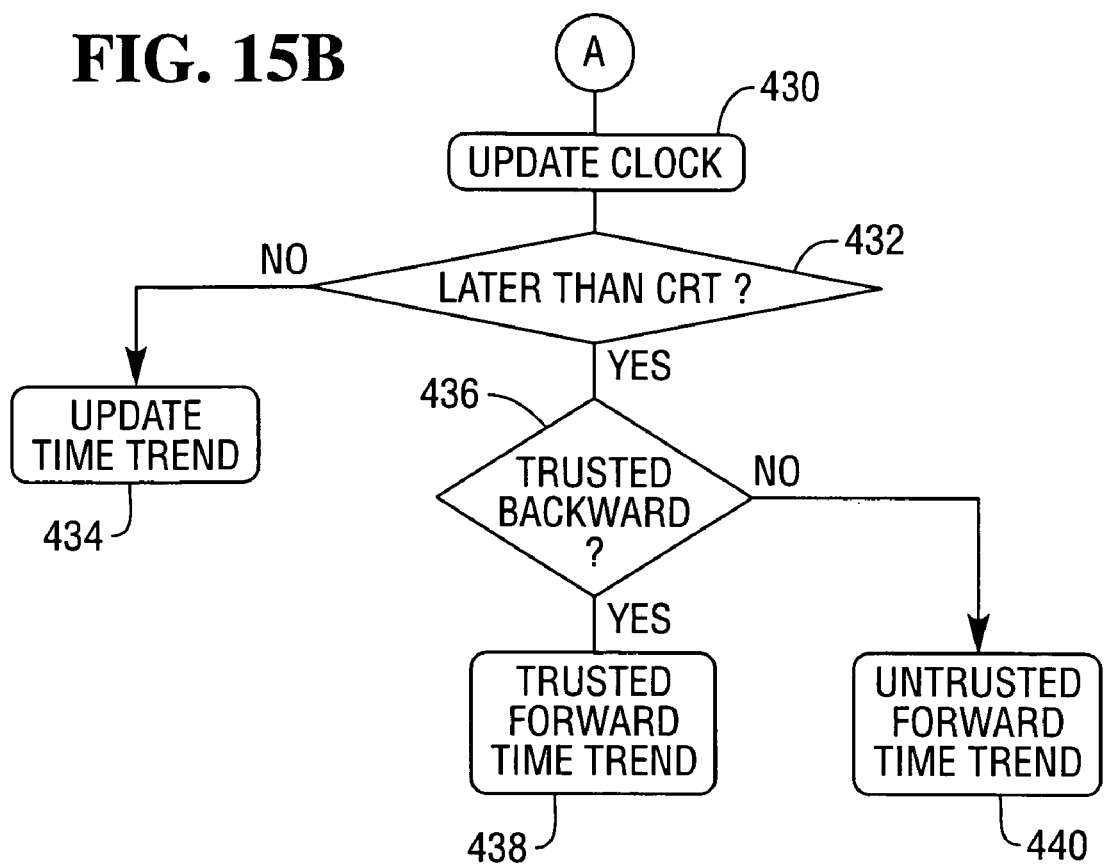

Implementing a trusted time change to the clock 24 will now be described with reference to FIG. 15.

Initially, the authorized user accesses the time adjusting mechanism 122 and makes a request to change the time on the clock 24, either forward or backward, which is received by the time adjusting mechanism 122 (step 400).

This request is reviewed by the time trend compliance component 96 (the access validator 112) to ascertain if the proposed new time is within the license period of the authorized user's key fob 100 (step 402). If not, then the request is denied (step 404). If the proposed new time is within the license period of the authorized user's key fob 100, then the time trend compliance component 96 ascertains if it is a forward or reverse time change (that is, if the request is to move the clock 24 to a chronologically later or earlier time) (step 406).

If the request is for a backward time change, then the time trend compliance component 96 ascertains if the proposed new time is earlier or later than the CRT (stored in the time trend block 90) (step 408).

If the proposed new time is earlier than the CRT then the time trend compliance component 96 ascertains if this would be a change to the time trend (that is, from trusted or untrusted forward to trusted backward) (step 410).

If this is a new time trend, then the time trend compliance component 96 updates the clock 24 with the proposed new time (step 412) and then changes the time trend to trusted backward (step 414) in the time trend block 90. This is achieved by the time trend reporter 116 copying the current time trend 94*a* (which is either forward or trusted forward) to the previous forward time trend 94*c*, and updating the current time trend 94*a*. The new current time trend 94*a* reflects that the new mode in the trend type field 98*a* is trusted backward, the new time in the start time field 98*b* and the latest time field 98*c* is the newly changed time, the reading count field 98*d* has the value "1", and the unique identifier read form the USB key fob 100 ("012451" in this example) is written to the identifier field 98*e*.

If this is not a new time trend, then the time trend compliance component 96 ascertains if the serial number of the USB key fob 100 requesting this time change is the same as the serial number used to enter the trusted backward time request (step 416). This is implemented by reading the serial number from identifier field 98*e* (which stores a unique serial number of the USB key fob 100 used when the clock 24 was changed to the current time trend).

If the serial numbers are not the same, then the request is denied (step 404).

If the serial numbers are the same, then the time trend compliance component 96 updates the clock 24 with the proposed new time (step 418).

This is ensures that successive backward changes are not made using different key fobs 100 with overlapping license periods.

Returning to step 408, if the proposed new time (which is a backward change) is later than the CRT then the current time trend (immediately prior to requesting the proposed new time) is most likely to be trusted forward. It is unlikely to be untrusted forward because the CRT value was updated when the ATM 10 entered supervisor mode, and field engineers do not normally stay in supervisor mode for more than a few hours (typically, less than one hour). However, it is possible that the proposed backward change to the clock is a minor change, for example, to correct the clock 24 by a small amount, so it is possible that the current time trend is untrusted forward. In any event, the compliance component 96 updates the clock 24 with the proposed new time (step 420)

and then updates the time trend block 90 (step 422). This involves ensuring that the new current time trend 94a is untrusted forward (which it may have been prior to the backward time change), updating the start time field 98b (if necessary), and writing the proposed new time to the latest time field 98c, so that the CRT is updated to the proposed new time.

Returning now to step 406, if the request for a time adjustment relates to a forward time change, then the time trend compliance component 96 updates the clock 24 to the proposed new time (step 430).

The time trend compliance component 96 then ascertains if the new time is earlier or later than the CRT (stored in the time trend block 90) (step 432).

If the proposed new time is earlier than the CRT then the current mode (immediately prior to requesting the proposed new time) is trusted backward (because no authorized user is permitted access when the current mode is untrusted backward (see step 318 of FIG. 13)), so the time trend compliance component 96 updates the current time trend entry 94a in the time trend block 90 (step 434). The time trend remains as trusted backward (field 98a), but the latest time field 98c is updated to the new time, and the reading count field 98d is incremented by one. Because the mode is still trusted backward, the CRT is not updated and it is still located in the latest reading field 98c of the previous forward entry 94c.

If the proposed new time is later than the CRT (step 432) then the time trend compliance component 96 ascertains if the current mode is trusted backward (step 436).

If the current mode is not trusted backward, then the time trend compliance component 96 updates the current time trend entry 94a to reflect the fact that the new mode is trusted forward (which it may also have been immediately prior to the proposed time change) (step 438). This is implemented in the following way. If the current time trend (that is, the time trend immediately prior to effecting the proposed time change) is untrusted forward, then that entry is copied to the previous forward entry 94c, and a new entry is created for the new current time trend 94a (trusted forward) using the proposed new time in both the starting time field 98b and the latest time field 98c. If the previous time trend was trusted forward then that entry is updated so that the latest time field 98c stores the new time. In either case, the CRT is the latest time in the previous forward time trend (that is, the latest field 98c in the previous forward entry 94c is the CRT).

Returning to step 436, if the current mode is trusted backward, then the time trend compliance component 96 changes the current time trend from trusted backward to untrusted forward. This is implemented by copying the trusted backward entry to the previous backward trend entry 94b. The starting time field 98b and latest time field 98c in the current time trend entry 94a are both now updated to reflect the new time, and the CRT is equal to the latest time field 98c in the new entry 94a because the new time trend is untrusted forward. The reason that the time trend is untrusted forward rather than trusted forward is that the CRT does not track changes in the time read from the clock 24 (that is, the CRT does not advance) when in trusted forward mode (although clock readings are still recorded), only when in untrusted forward mode. If the clock 24 is advanced when the time trend is backward trusted then the time trend compliance component 136 is programmed to recognize this as the authorized user returning the clock 24 to the correct time, which is indicated by untrusted forward mode (not trusted forward mode).

It should now be appreciated that the above embodiment has the advantage that it should not be possible to change the time backward such that a genuinely expired access token (for example, USB key fob 100) is recognized as being valid. It should also not be possible to "piggy-back" reverse time changes such that access tokens with overlapping licenses can be used.

Various modifications may be made to the above embodiment within the scope of the present invention. For example, in other embodiments, a log may be used to store all readings from the clock 24; thus, when a new previous forward entry, or a new previous backward entry is written to the time trend block 90, then the entry that is to be overwritten may first be copied to a log that stores all previous time trends. This log may be used to provide a graphical indication of the time trends.

In other embodiments, the self-service terminal may be a different type of terminal than an ATM, such as a check-in and/or check-out terminal used in the financial, postal, retail, gaming, healthcare, airline, hospitality, or vehicle rental industries.

The access token may have a different implementation to a USB key, for example, it may be an integrated circuit card, an RFID carrier, or the like.

In the above embodiment, the clock is polled every twenty-four hours, but any convenient polling frequency may be used, for example every half hour, one hour, six hours, forty-eight hours, weekly, or the like.

In other embodiments, error messages may be created by the time trend compliance component 96 for presenting to a user of the ATM 10 on the rear operator panel. Alternatively or additionally, these error messages may be sent to a central monitoring system connected to the ATM 10 via the network connection 12h. This has the advantage of alerting an entity owning, managing, or deploying the ATM 10 that an attempt has been made to alter the clock 24.

In the above embodiment, a rear access ATM is described. In other embodiments, the self-service terminal may be a front access ATM, so that no rear operator panel 12i is required because the customer display 12c can be used instead of a rear operator panel 12i to access the restricted and unrestricted functions.

In the above embodiment, the time included the date in addition to hours and minutes. In other embodiments, the time may be measured in a different way; for example, using an absolute number which may be a measure of the number of seconds elapsed since a certain date, or a measure of minutes elapsed since a certain date, a measure of date and hour, a measure of the date only, or the like. Any convenient measurement of time may be used at any convenient granularity (for example, on a per day basis, on a per hour basis, on a per second basis, or the like).

In other embodiments, the system application 86, or other management component, may set a flag if the current time trend is trusted backward or untrusted backward.

In other embodiments, if a user, such as a field engineer, attempts to change the time to a time outside their license period, a message may be displayed informing them, for example, that dates earlier than "DD/MM/YYYY" are invalid, where "DD/MM/YYYY" is the start of the license period. Any convenient format may be used for this message.

What is claimed is:

1. A method of authorizing access to one or more restricted functions provided by a processing device, the method comprising:

reading at least one time from a clock associated with the processing device;

storing the read time as a reference time;

after the storing step, reading a current time from the clock;

comparing the reference time with the current time;

reading a trend status associated with the reference time, the trend status indicating whether the clock is moved backward by an authorized user using an access token, whether the clock is moved backward by an unauthorized user, whether the clock is moved forward by the authorized user using an access token, or whether the clock is moved forward by the unauthorized user, wherein the trend status indicating how and if the clock has been adjusted and in what manner a change in the trend status indicates a discontinuity in a time trend; and authorizing access to the restricted functions provided by the processing device when (i) the read current time is chronologically later than the reference time and the trend status indicates no discontinuity and when (ii) the read current time is chronologically earlier than the reference time and the trend status is trusted backward mode, wherein option (ii) is limited to the same authorized user that adjusted the clock back in time, wherein the same access token that was used to change the trend status to the trusted backward mode is received prior to authorizing access to the restricted functions under option (ii).

2. A method according to claim 1, wherein the method further comprises allowing an unauthorized field engineer to access certain unrestricted functions.

3. A method according to claim 1, wherein the method further comprises:
receiving an access token;
reading an access time at which an attempt is made to access the processing device;
reading an authorized access time period from the access token; and
allowing the attempt to access the processing device to continue if the access time is within the authorized access time period.

4. A method according to claim 1, wherein the method further comprises:
providing a privileged time adjusting mechanism only to logged in authorized users, so that a trusted mode is only entered when the privileged time adjusting mechanism is used to change the time on the clock.

5. A method according to claim 1, wherein in addition to storing the reference time, the method includes storing details about a previous forward mode and a previous backward mode.

6. A method according to claim 1, wherein the method further comprises maintaining a log of historical reference times, and displaying this log visually as a graph.

7. A method according to claim 1, wherein the method further comprises requesting a passcode, and authenticating the entered passcode, prior to allowing a user to access the processing device.

8. A method according to claim 1, wherein the attempt to access the processing device may be an attempt to access service software on an ATM.

9. A processing device comprising:
a clock configured to monitor time;
a memory configured to store a reference time read from the clock together with a trend status associated with that time;
a controller configured to read a current time from the clock and to authorize access to restricted functions provided by the processing device only if an acceptance criterion is satisfied, where the acceptance criterion includes (i) the read current time being chronologically later than the reference time and a trend status being in a trusted backward mode, a change in the trend status indicates a discontinuity in a time trend, and wherein the acceptance criterion takes into account the mechanism by which the clock operates and whether the clock has been altered and by whom altered the clock, and authorizing access when (ii) the read current time is chronologically earlier than the reference time and the trend status is the trusted backward mode wherein the clock is moved backward by an authorized user using an access token, wherein option (ii) is limited to a same authorized user that adjusted the clock back in time, and wherein the same access token that was used to change the trend status to the trusted backward mode is received prior to authorizing access to the restricted functions under option (ii).

10. A processing device according to claim 9, wherein the controller is further configured to allow the clock to be changed by a user, without preventing access to the restricted functions, once that user's attempt to access the processing device has been successful.

* * * * *